Dec. 4, 1934.  E. J. SWEETLAND  1,982,840
ADJUSTABLE LAWN SPRINKLING MEANS
Filed June 8, 1932
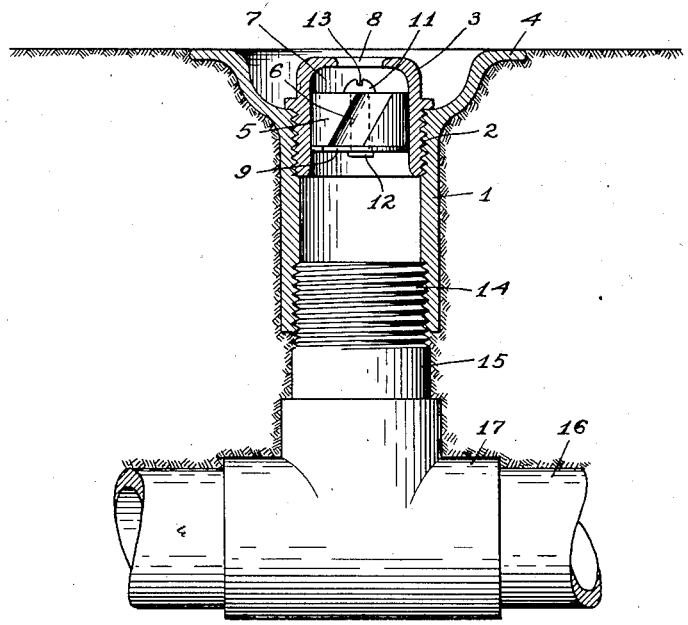
Fig-1-
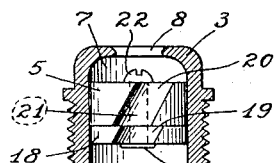
Fig-2-
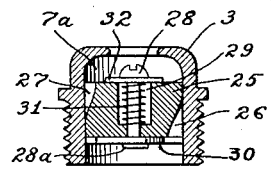
Fig-3-
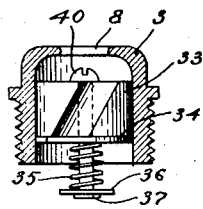
Fig-4-
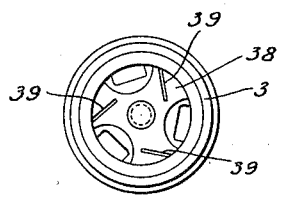
Fig-5-
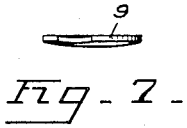
Fig-7-
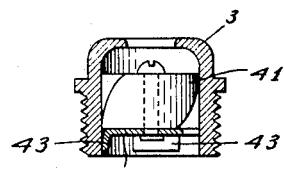
Fig-6-
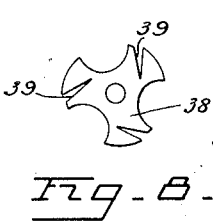
Fig-8-
INVENTOR.
Ernest J Sweetland Patented Dec. 4, 1934

1,982,840

UNITED STATES PATENT OFFICE 1,982,840

ADJUSTABLE LAWN SPRINKLING MEANS

Ernest J. Sweetland, Piedmont, Calif.

Application June 8, 1932, Serial No. 615,973

5 Claims. (Cl. 299—60)

The present invention contemplates lawn sprinkling means of the adjustable type and while it relates especially to the imbedded type of sprinkler head which is permanently attached to an underground pipe, it may also be employed in connection with portable sprinklers.

In the irrigation of lawns it is well known practice to supply the lawn with a plurality of underground water supply pipes, each of which is equipped with an imbedded sprinkler head at regular intervals which may vary in ordinary practice from 8 or 10 feet apart up to 15 or 20 feet, depending upon the amount of water discharged from each nozzle and the area which the spray from each nozzle is capable of covering.

It is found in practice that due to the variation in shape and contour of the lawn it is often desirable to adjust the discharge of the nozzles individually so as to obtain even coverage and maximum benefit from the water employed.

I am aware that nozzles have been devised with a valve adjustment associated with the nozzle in such manner that individual adjustment is possible, but adjusting means heretofore employed are open to certain objections which are overcome by the present invention. For instance, some of the nozzles now on the market have an independent adjusting valve located within the body of the nozzle in such manner that the aperture is not easy of access in the event of it becoming clogged; and the further objection is that the valve mechanism is independent of the spray forming apertures in the nozzle, so that the pressure of water is reduced before reaching the spray forming apertures. Therefore when the flow is restricted by means of the valve, the pressure is cut down and the efficiency of the spray is thus impaired.

The present invention not only is extremely simple in construction and consequently inexpensive, but offers the advantage that the full pressure is delivered to a point immediately adjacent the angular spray forming apertures so that better results are obtained.

A further advantage of my invention resides in spring controlled means of maintaining a uniform degree of friction upon the valve so that it is always properly seated without the likelihood of the valve becoming stuck in any particular position due to corrosion.

Referring to the accompanying drawing:

Figure 1 represents a side elevation of the invention in position imbedded in the surface of the lawn.

Figure 2 shows a modified form of the invention wherein the apertures in the valve member are formed at an angle corresponding with the angle of the spray forming apertures.

Figure 3 shows a further modification wherein a compression spring is imbedded in the disc which is provided with spiral apertures for creating the spray.

Figure 4 shows a further modification of the same invention wherein an external compression spring is employed.

Figure 5 shows a further modification wherein spring tension is created by a plurality of slots in the valve forming member.

Figure 6 is a further modification wherein the spring tension is created by means of flanged projections formed on the valve member.

Figure 7 is a side elevation of the valve member employed in the construction illustrated in Figure 1.

Figure 8 is a plan view of the valve member illustrated in Figure 5 removed from the casing.

Referring to the drawing in detail and particularly to Figure 1, the numeral 1 indicates a sprinkler head casing which is preferably made of a brass casting which is circular in cross section and which is provided with the threaded opening 2 which receives the nozzle member 3 with its attendant parts. 4 is a circular flange which surrounds the nozzle 3 and protects it against injury from lawn mowers and the like, and at the same time prevents the grass from growing too closely around the nozzle aperture. 5 is a circular disc which is provided with 2 or more angular grooves 6 which produce a swirling motion of the water as it enters the chamber 7 to create the swirling spray as the water discharges through the aperture 8. 9 is a rotary valve which is secured in place by means of the slotted rivet 11 and this rivet is headed over at the point 12 and expanded into the central hole in the valve member 9, so that when the slotted rivet is turned, the valve member 9 turns with it. In this construction the valve member 9 is formed with a slight convexity as shown in detail in Figure 7 so that when the rivet is headed over in place, the valve member tends to flatten out and being preferably made of a springy metal, sufficient friction is created to prevent the valve turning except when a screw driver is applied to the slot 13 of the rivet 11. In this construction as in all of the modifications the disc 5 is a driving fit into the port of the nozzle 3 so that the disc is stationary with relation to the casing. 14 is a pipe thread which fits upon the underground nipple 15 which is supplied with water under pressure through the pipe 16 and the T 17.

Referring to Figure 2 the nozzle casing 3 is the same as shown in Figure 1. This casing is provided with the disc 5 which is a driving fit into casing 3 as previously described. In this modification the valve member 18 is somewhat thicker than shown in Figure 1 and is provided with angular slots 19 which tend to promote a swirling motion of the water as it enters the angular slots 20 in the disc 5. There are preferably from 2 to 5 angular slots 20 in the disc 5 and a corresponding number of openings 19 which, when the valve is open, register with the slotted openings 20. The member 18 is held in place by the rivet 21 which is provided with the slotted head 22 and is headed over on the lower side of the valve at the point 23 with sufficient tightness to provide the desired friction between the two parts and thus prevent the valve member 18 from rotating due to the discharge of water through the slots 19 and 20.

Referring to Figure 3 the valve casing 3 is equipped with the disc 25 which in this instance is provided with spiral grooves 26 and 27 which give the desired swirling motion to the water as it enters the chamber 7a. In this modification the valve member 30 is a flat disc having apertures corresponding to the spiral openings 26 and 27. The valve member 30 is held in place by the slotted rivet 28 which is rigidly fixed to the valve member 30 at the point 28a. The disc 25 is provided with a recess 29 which receives the compression spring 31 which bears against the washer 32 at its upper end. The spring 31 being strongly compressed holds the valve member 30 in its adjusted position at all times.

In the modification shown in Figure 4 the casing 3 is provided with the angularly slotted disc 33 and the valve member 34 which is held in frictional engagement against the disc 33 by means of spiral compression spring 35 which is supported by the washer 36. This washer is secured to the lower end of the slotted rivet 40 which is headed over at the point 37.

Figure 5 represents an inverted plan view of a valve member 38 which may be of the same general form as the valve members shown in previous figures, except that in this instance the valve member 38 is provided with slots 39 which supply the necessary spring action to hold the valve in place at all times except when it is voluntarily turned by means of a screw driver. These slots appear in this figure with parallel sides, but when released from the casing 3 these slots spread to the position indicated in Figure 8. It is through the partial closing of these slots that spring tension against the side walls of the casing 3 is created and the valve is thus held in its normal position. The opening of the slots 39 is exaggerated in Figure 8 to better illustrate the point.

Figure 6 is a further modification in which the casing 3 is provided with a slotted or grooved disc 41 which may be of the design illustrated in any of the previous figures. In this modification the valve member 42 is stamped out of thin metal, preferably spring bronze, having apertures to correspond with the apertures in the disc 41, and the spring action is created by the downwardly turned projections 43 which spring outwardly against the walls of the casing 3 to create the desired spring tension.

Figure 7 shows a form of valve disc such as is used in Figure 1. In this figure the convexity which creates the desired spring action to hold the valve in adjusted position is clearly shown.

The operation of the valve in this sprinkler nozzle for which invention is claimed, is as follows:

If the full discharge of the nozzle is desired, then the valve member is so placed that its openings are in full alignment with the angular or spiral grooves in the periphery of the disc to which is it secured. If desired to cut down the discharge from the nozzle, a screw driver is applied through the opening 8 to the slotted rivet head and the valve member is turned to any desired degree whereby the size of discharge apertures are cut down, thus making it possible to regulate the flow from a very small fraction of a gallon of water per minute up to the full capacity of the nozzle.

Where the term slide valve is used in the following claims it is intended to define the rotary valve member which slides upon the surface of the perforated partition in the casing. This slide valve is designated by the numerals 9, 18, 30, 34, 38 and 42 respectively of the various views of the drawing.

While in the various drawings I have shown the perforated partition as being superimposed upon the rotary valve member, it should be understood that in practice the valve member may be above the stationary perforated partition if desired.

Although I have shown a screw driver slot in the central rivet in the several drawings, it should be understood that any form of wrench receiving face may be employed if desired, such for instance, as a square or hexagonal head.

While I have illustrated and described preferred forms of my invention, it should be understood that the invention is subject to many modifications and that I am limited only to the invention as set forth in the following claims as limited by the prior art.

What I claim is:

1. A sprinkling device comprising a nozzle member having a central discharge opening; a stationary perforate disc secured within said member; a revolvable disc secured in registration with said stationary disc and provided with apertures adapted to be placed in registration and form a valve with the perforations in the stationary disc; means holding said revolvable disc in any selected position; and a pivot non-rotatably fixed to the revolvable disc and extending upwardly through an opening in the stationary disc, said pivot terminating in a tool receiving surface accessible through said discharge opening.

2. A sprinkling device comprising a nozzle member having a central discharge opening; a stationary perforate disc secured within said member; a revolvable disc secured in registration with said stationary disc and provided with apertures adapted to be placed in registration and form a valve with the perforations in the stationary disc; means holding said discs in frictional engagement with each other; and a pivot non-rotatably fixed to the revolvable disc and extending upwardly through an opening in the stationary disc, said pivot terminating in a tool receiving surface accessible through said discharge opening.

3. A sprinkling device comprising a nozzle member having a central discharge opening; a stationary perforate disc secured within said member; a revolvable disc secured in registration with said stationary disc and provided with apertures adapted to be placed in registration and form a valve with the perforations in the stationary disc; a spring holding said discs in frictional engagement with each other; and a pivot non-rotatably fixed to the revolvable disc and extending upwardly through an opening in the stationary disc, said pivot terminating in a tool receiving surface accessible through said discharge opening.

4. A sprinkling device comprising a nozzle member having a central discharge opening; a stationary perforate disc secured within said member; a revolvable disc secured in registration with said stationary disc and provided with apertures adapted to be placed in registration and form a valve with the perforations in the stationary disc; means holding said revolvable disc in frictional engagement with said nozzle member; and a pivot non-rotatably fixed to the revolvable disc and extending upwardly through an opening in the stationary disc, said pivot terminating in a tool receiving surface accessible through said discharge opening.

5. A sprinkling device comprising a nozzle having a pair of internal discs provided with registering openings, one of said discs being mounted in stationary relation to said nozzle and the other being revolvably secured by a pivot to said stationary disc, said pivot being non-rotatively secured to the revolvable disc and having a tool receiving surface in alignment with a discharge opening in said nozzle, and means holding the revolvable disc in any selected position with respect to the stationary disc.

ERNEST J. SWEETLAND.